Patented May 12, 1931

1,804,556

UNITED STATES PATENT OFFICE

MARINO GENTILE, OF CHICAGO, ILLINOIS, ASSIGNOR OF ONE-HALF TO SAMUEL W. WEIS, AND ONE-FOURTH TO GEORGE PICK, BOTH OF CHICAGO, ILLINOIS

COMPOSITE COVERING MATERIAL

No Drawing.      Application filed June 26, 1929. Serial No. 373,952.

This invention relates to materials such as are used for covering or packaging foods, and food products, pharmaceutical products, and other articles in sanitary wrappings, and for various other purposes and applications. Wrapping and covering films or sheets of gelatin have heretofore been used to some extent for this purpose, but owing to the fragile character and hygroscopic nature of this material such films break or tear easily and soon soften, become sticky and disintegrate, especially in damp climates. Films or sheets made of cellulose nitrate or gun cotton, have also been known, but owing to the high inflammability of this product, it is more or less dangerous to handle and transport.

The object of my present invention is to provide a tough, flexible and durable material which shall be non-porous and impervious to dust and moisture, grease proof, of low combustibility, cheap to manufacture, and capable of being made in sheet form or molded into the form of containers or receptacles, and amply strong to serve the purposes of a wrapper, seal, package or container for the above mentioned and other products under all climatic and atmospheric conditions.

In carrying out my invention for the production of a wrapper covering or container, I start with a film or sheet of a protein substance, such as gelatin, casein, albumin, agar-agar and alginate products, all of which substances are capable of being prepared in the shape of a film, sheet or molded form, and I then coat this film, sheet or molded form, preferably on both sides, with a solution containing cellulose nitrate as its chief ingredient. This coating solution may be prepared by first dissolving the cellulose nitrate in a proper amount of a suitable solvent such as ethyl acetate, amyl acetate, or equivalent solvents, which yields a freely flowing solution. To this cellulose nitrate solution is then added a non-hygroscopic organic substance which will cause the cellulose nitrate coating to adhere evenly and uniformly to the gelatin or other protein sheet, and incidentally may act as a plasticizer to render the product soft and pliable, when dry; substances which I have found well adapted to this purpose are castor oil, dibutyl phthalate, and tricresyl phosphate; but other non-hygroscopic organic substances of similar characteristics may be used.

The coating solution can be applied to the base film or sheet in any suitable way, as by dipping the base sheet in, or drawing it through, a body of coating solution, or by flowing the latter over, or brushing, spraying or printing it on the base sheet. To secure the most perfect adhesive effect, the amount of the organic substance added to the cellulose nitrate solution may be any amount not exceeding 80% by weight of the content of the dried cellulose nitrate coating, depending upon the particular organic binder used.

The coating or covering is then dried, and the resultant product is a tough, flexible film, sheet or molded form of greater strength for the same thickness than either gelatin or cellulose nitrate alone, less combustible than ordinary paper, non-porous and impervious to dust, grease, and moisture, and thus excellently adapted to serve the purposes of a sanitary wrapper or container, especially for food and pharmaceutical products and other articles, and low in cost of materials and manufacture. When made from any of the materials hereinabove specified, the product is also highly transparent. If a colored product is desired, I have found that a permanent colored effect may be obtained by the use of suitable dyes that are soluble in the cellulose nitrate coating solution.

While I have found that the materials best adapted to serve all the purposes and characterists of the invention above recited are gelatin for the base film or sheet, and cellulose nitrate admixed with any one or more of the organic substances above named for the coating or covering, I do not limit the invention, in its broadest aspect, to these substances, but may employ such equivalents as are adapted to yield a product having the qualities and characteristics hereinabove described. The resulting product is not only moisture and grease proof but it is also completely resistant to the action of insects, bacteria, fungi and mold growths, and dilute solutions of most chemicals, thus affording perfect protection to the contents of the wrapper or container.

As hereinabove indicated, the invention may take not only the form of a film or sheet that may serve as a wrapper or covering, but it may also take the form of a molded article such as a cup, carton, capsule, or the like, in which case the gelatin or other protein base may be first molded to the desired form, and the cellulose nitrate coating then applied thereto in any of the ways above indicated.

This application constitutes a continuation in part of an application heretofore filed by me on the 11th day of February, 1928, Serial No. 253,794, wherein I have disclosed and claimed a specific embodiment of the product herein described wherein castor oil is employed in the mixture with the cellulose nitrate solution to secure the bonding of the cellulose nitrate coating to the base film.

I claim:

1. An integral transparent wrapping sheet of the character described consisting of a thin film of a protein substance as a base, a coating of cellulose nitrate applied to each face of said film and having incorporated therein a non-hygroscopic bonding agent (other than castor oil) in such a quantity as to cause the cellulose nitrate coating to become integrally united with the protein film on each side thereof, the thickness of the said film and coating respectively being such as that said resultant wrapping sheet will be tough, pliable, transparent, moisture, grease and water proof and adapted to readily conform to the shape of packages and the like without cracking or separating.

2. An integral transparent wrapping sheet of the character described consisting of a thin film of a protein substance as a base, a coating of cellulose nitrate applied to each face of said film and having incorporated therein a non-hygroscopic bonding agent (other than castor oil) in such a quantity up to 80% by weight of the dried coating of cellulose nitrate as to cause the cellulose nitrate coating to become integrally united with the protein film on each side thereof, the thickness of the said film and coating respectively being such as that said resultant wrapping sheet will be tough, pliable, transparent, moisture, grease and water proof and adapted to readily conform to the shape of packages and the like without cracking or separating.

3. An integral transparent wrapping sheet of the character described consisting of a thin film of a protein substance as a base, a coating of cellulose nitrate applied to each face of said film and having incorporated therein a non-hygroscopic bonding agent, selected from the group consisting of dibutyl phthalate and tricresyl phosphate and in such a quantity as to cause the cellulose nitrate coating to become integrally united with the protein film on each side thereof, the thickness of the said film and coating respectively being such as that said resultant wrapping sheet will be tough, pliable, transparent, moisture, grease and water proof and adapted to readily conform to the shape of packages and the like without cracking or separating.

MARINO GENTILE.